(12) United States Patent
Aliferis et al.

(10) Patent No.: US 9,772,741 B2
(45) Date of Patent: Sep. 26, 2017

(54) DATA ANALYSIS COMPUTER SYSTEM AND METHOD FOR ORGANIZING, PRESENTING, AND OPTIMIZING PREDICTIVE MODELING

(71) Applicants: Konstantinos (Constantin) F. Aliferis, Astoria, NY (US); Yin Aphinyanaphongs, New York, NY (US); Lawrence Fu, Long Island City, NY (US); Alexander Statnikov, New York, NY (US)

(72) Inventors: Konstantinos (Constantin) F. Aliferis, Astoria, NY (US); Yin Aphinyanaphongs, New York, NY (US); Lawrence Fu, Long Island City, NY (US); Alexander Statnikov, New York, NY (US)

( * ) Notice: Subject to any disclaimer, the term of this patent is extended or adjusted under 35 U.S.C. 154(b) by 332 days.

(21) Appl. No.: 14/216,585

(22) Filed: Mar. 17, 2014

(65) Prior Publication Data

US 2014/0279794 A1    Sep. 18, 2014

Related U.S. Application Data

(60) Provisional application No. 61/793,959, filed on Mar. 15, 2013.

(51) Int. Cl.
*G06F 17/00* (2006.01)
*G06N 5/02* (2006.01)
(Continued)

(52) U.S. Cl.
CPC ......... *G06F 3/0481* (2013.01); *G06N 99/005* (2013.01); *G06Q 50/18* (2013.01)

(58) Field of Classification Search
CPC  G06N 3/049; G06N 3/10; G06N 3/02; G06N 3/063; G06N 3/04
(Continued)

(56) References Cited

U.S. PATENT DOCUMENTS 6,636,862 B2 * 10/2003 Lundahl ............ G06F 17/30598
7,529,737 B2 *  5/2009 Aphinyanaphongs
  .......................... G06F 17/30705
(Continued)

OTHER PUBLICATIONS

Anomaly Detection Using the Poisson Process Limit for Extremes Stijn Luca; Peter Karsmakers; Bart Vanrumste 2014 IEEE International Conference on Data Mining Year: 2014 pp. 370-379, DOI: 10.1109/ICDM.2014.12 IEEE Conference Publications.*
(Continued)

*Primary Examiner* — Michael B Holmes
(74) *Attorney, Agent, or Firm* — Laurence Weinberger (57) ABSTRACT

Predictive modeling is an important class of data analytics with applications in numerous fields. Once a predictive model is built, validated, and applied on a set of objects, by a data analytics system (or even by manual modeling), consumers of the model information need assistance to navigate through the results. This is because both regression and classification models that output continuous values (eg, probability of belonging to a class) are often used to rank objects and then a thresholding of the ranked scores needs to be used to separate objects into a "positive" and a "negative" class. The choice of threshold greatly affects the true positive, false positive, true negative, and false negative results of the model's application. An ideal data analytics system should allow the user to understand the tradeoffs of different threshold values for different thresholds. The user interface should convey this information in an intuitive manner and provide the ability to vary the threshold interactively while simultaneously presenting the effects of thresholding on
(Continued)

predictivity. This is precisely the function of the present invention. In addition to manual thresholding, the invention also allows for the thresholding to be performed by fully automated means (via standard statistical optimization methods) once a user has identified the desired balance of false positives and false negatives (or other predictivity metrics of interest). The invention can be applied to any application field of predictive modeling.

12 Claims, 9 Drawing Sheets

(51) Int. Cl.
  *G06F 3/0481* (2013.01)
  *G06N 99/00* (2010.01)
  *G06Q 50/18* (2012.01)

(58) Field of Classification Search
  USPC .......................................................... 706/46
  See application file for complete search history.

(56) References Cited

U.S. PATENT DOCUMENTS

| | | | | |
|---|---|---|---|---|
| 7,912,698 | B2* | 3/2011 | Statnikov | G06F 19/24 704/257 |
| 8,219,383 | B2* | 7/2012 | Statnikov | G06F 19/24 704/257 |
| 8,275,772 | B2* | 9/2012 | Aphinyanaphongs | G06F 17/3071 707/738 |
| 8,527,442 | B2* | 9/2013 | Fu | G06N 99/005 706/46 |
| 8,655,821 | B2* | 2/2014 | Aliferis | G06N 99/005 706/46 |
| 8,805,761 | B2* | 8/2014 | Statnikov | G06K 9/6228 706/46 |
| 8,832,002 | B2* | 9/2014 | Fu | G06F 17/30705 706/12 |
| 9,471,452 | B2* | 10/2016 | McElhinney | G06F 11/0751 |
| 9,477,572 | B2* | 10/2016 | Suit | G06F 9/5077 |
| 9,569,330 | B2* | 2/2017 | Suit | G06F 11/3006 |
| 9,720,940 | * | 8/2017 | Aliferis | G06F 17/30292 |
| 2010/0046624 | A1* | 2/2010 | Archibald | H04N 19/176 375/240.16 |
| 2011/0143811 | A1* | 6/2011 | Rodriguez | G06K 9/00986 455/556.1 |
| 2012/0284213 | A1* | 11/2012 | Lin | G06N 3/08 706/12 |

OTHER PUBLICATIONS

Automated prediction of adverse post-surgical outcomes Katharine Hergenroeder; Timothy Carroll; Alec Chen; Caroline Iurillo; Peter Kim; Zachary Terner; Matthew Gerber; Donald Brown 2014 Systems and Information Engineering Design Symposium (SIEDS) Year:14 pp. 227-232, DOI: 10.1109/SIEDS.2014.6829880 IEEE Conference Publications.*

Automatic clustering of part-of-speech for vocabulary divided PLSA language model Motoyuki Suzuki; Naoto Kuriyama; Akinori Ito; Shozo Makino 2008 International Conference on Natural Language Processing and Knowledge Engineering Year: 2008 pp. 1-7, DOI: 10.1109/NLPKE.2008.4906747 IEEE Conference Publications.*

Biometric enhancements: Template aging error score analysis John W. Carls; Richard Raines; Michael Grimaila; Steven Rogers 2008 8th IEEE International Conference on Automatic Face & Gesture Recognition Year: 2008 pp. 1-8, DOI: 10.1109/AFGR.2008.4813331 IEEE Conference Publications.*

\* cited by examiner

DATA ANALYSIS COMPUTER SYSTEM AND METHOD FOR ORGANIZING, PRESENTING, AND OPTIMIZING PREDICTIVE MODELING

Benefit of U.S. Provisional Application No. 61/793,959 filed on Mar. 15, 2013 is hereby claimed.

BACKGROUND OF THE INVENTION

Field of Application

The field of application of the invention is data analysis especially as it applies to (so-called) "Big Data" (see sub-section 1 "Big Data and Big Data Analytics" below). The methods, systems and overall technology and knowhow needed to execute data analyses is referred to in the industry by the term data analytics. Data analytics is considered a key competency for modern firms [1]. Modern data analytics technology is ubiquitous (see sub-section 3 below "Specific examples of data analytics application areas"). Data analytics encompasses a multitude of processes, methods and functionality (see sub-section 2 below "Types of data analytics").

Data analytics cannot be performed effectively by humans alone due to the complexity of the tasks, the susceptibility of the human mind to various cognitive biases, and the volume and complexity of the data itself. Data analytics is especially useful and challenging when dealing with hard data/data analysis problems (which are often described by the term "Big Data"/"Big Data Analytics" (see sub-section 1 "Big Data and Big Data Analytics").

1. Big Data and Big Data Analytics

Big Data Analytics problems are often defined as the ones that involve Big Data Volume, Big Data Velocity, and/or Big Data Variation [2].

Big Data Volume may be due to large numbers of variables, or big numbers of observed instances (objects or units of analysis), or both.

Big Data Velocity may be due to the speed via which data is produced (e.g., real time imaging or sensor data, or online digital content), or the high speed of analysis (e.g., real-time threat detection in defense applications, online fraud detection, digital advertising routing, high frequency trading, etc.).

Big Data Variation refers to datasets and corresponding fields where the data elements, or units of observations can have large variability that makes analysis hard. For example, in medicine one variable (diagnosis) may take thousands of values that can further be organized in interrelated hierarchically organized disease types.

According to another definition, the aspect of data analysis that characterizes Big Data Analytics problems is its overall difficulty relative to current state of the art analytic capabilities. A broader definition of Big Data Analytics problems is thus adopted by some (e.g., the National Institutes of Health (NIH)), to denote all analysis situations that press the boundaries or exceed the capabilities of the current state of the art in analytics systems and technology. According to this definition, "hard" analytics problems are de facto part of Big Data Analytics [3].

2. Types of Data Analysis:

The main types of data analytics [4] are:

a. Classification for Diagnostic or Attribution Analysis: where a typically computer-implemented system produces a table of assignments of objects into predefined categories on the basis of object characteristics.

Examples: medical diagnosis; email spam detection; separation of documents as responsive and unresponsive in litigation.

b. Regression for Diagnostic Analysis: where a typically computer-implemented system produces a table of assignments of numerical values to objects on the basis of object characteristics.

Examples: automated grading of essays; assignment of relevance scores to documents for information retrieval; assignment of probability of fraud to a pending credit card transaction c. Classification for Predictive Modeling: where a typically computer-implemented system produces a table of assignments of objects into predefined categories on the basis of object characteristics and where values address future states (i.e., system predicts the future).

Examples: expected medical outcome after hospitalization; classification of loan applications as risky or not with respect to possible future default; prediction of electoral results, d. Regression for Predictive Modeling: where a typically computer-implemented system produces a table of assignments of numerical values to objects on the basis of object characteristics and where values address future states (i.e., system predicts the future) Examples: predict stock prices at a future time; predict likelihood for rain tomorrow; predict likelihood for future default on a loan.

e. Explanatory Analysis: where a typically computer-implemented system produces a table of effects of one or more factors on one or more attributes of interest; also producing a catalogue of patterns or rules of influences.

Examples: analysis of the effects of sociodemographic features on medical service utilization, political party preferences or consumer behavior.

f. Causal Analysis: where a typically computer-implemented system produces a table or graph of causes-effect relationships and corresponding strengths of causal influences describing thus how specific phenomena causally affect a system of interest.

Example: causal graph models of how gene expression of thousands of genes interact and regulate development of disease or response to treatment; causal graph models of how socioeconomic factors and media exposure affect consumer propensity to buy certain products; systems that optimize the number of experiments needed to understand the causal structure of a system and manipulate it to desired states.

g. Network Science Analysis: where a typically computer-implemented system produces a table or graph description of how entities in a big system inter-relate and define higher level properties of the system.

Example: network analysis of social networks that describes how persons interrelate and can detect who is married to whom; network analysis of airports that reveal how the airport system has points of vulnerability (i.e., hubs) that are responsible for the adaptive properties of the airport transportation system (e.g., ability to keep the system running by rerouting flights in case of an airport closure).

h. Feature selection, dimensionally reduction and data compression: where a typically computer-implemented system selects and then eliminates all variables that are irrelevant or redundant to a classification/regression, or explanatory or causal modeling (feature selection) task;

or where such as system reduces a large number of variables to a small number of transformed variables that are necessary and sufficient for classification/regression, or explanatory or causal modeling (dimensionality reduction or data compression).

Example: in order to perform web classification into family-friendly ones or not, web site contents are first cleared of all words or content that is not necessary for the desired classification.

i. Subtype and data structure discovery: where analysis seeks to organize objects into groups with similar characteristics or discover other structure in the data.

Example: clustering of merchandize such that items grouped together are typically being bought together; grouping of customers into marketing segments with uniform buying behaviors.

j. Feature construction: where a typically computer-implemented system pre-processes and transforms variables in ways that enable the other goals of analysis. Such pre-processing may be grouping, abstracting, existing features or constructing new features that represent higher order relationships, interactions etc.

Example: when analyzing hospital data for predicting and explaining high-cost patients, co-morbidity variables are grouped in order to reduce the number of categories from thousands to a few dozen which then facilitates the main (predictive) analysis; in algorithmic trading, extracting trends out of individual time-stamped variables and replacing the original variables with trend information facilitates prediction of future stock prices.

k. Data and analysis parallelization, chunking, and distribution: where a typically computer-implemented system performs a variety of analyses (e.g., predictive modeling, diagnosis, causal analysis) using federated databases, parallel computer systems, and modularizes analysis in small manageable pieces, and assembles results into a coherent analysis.

Example: in a global analysis of human capital retention a world-wide conglomerate with 2,000 personnel databases in 50 countries across 1,000 subsidiaries, can obtain predictive models for retention applicable across the enterprise without having to create one big database for analysis.

Important note about terminology: in common everyday use (e.g., in common parlance, in the business analytics, and even in parts of the scientific and technical literature) the term "predictive modeling" is used as general-purpose term for all analytic types a, b, c, d, e without discrimination. This is for narrative convenience since it is much less cumbersome to state, for example, that "method X is a predictive modeling method" as opposed to the more accurate but inconvenient "method X is a method that can be used for Classification for Diagnostic or Attribution Analysis, and/or Regression for Diagnostic Analysis, and/or Classification for Predictive Modeling, and/or Regression for Predictive Modeling, and/or Explanatory Analysis". In those cases it is inferred from context what is the precise type of analysis that X is intended for or was used etc.

The present application utilizes this simplifying terminological convention and refers to "predictive modeling" as the application field of the invention to cover analysis types a, b, c, d, and e.

3. Specific Examples of Data Analytics Application Areas:

The following Listing provides examples of some of the major fields of application for the invented system specifically, and Data Analytics more broadly [5]:

1. Credit risk/Creditworthiness prediction.
2. Credit card and general fraud detection.
3. Intention and threat detection.
4. Sentiment analysis.
5. Information retrieval, filtering, ranking, and search.
6. Email spam detection.
7. Network intrusion detection.
8. Web site classification and filtering.
9. Matchmaking.
10. Predict success of movies.
11. Police and national security applications
12. Predict outcomes of elections.
13. Predict prices or trends of stock markets.
14. Recommend purchases.
15. Online advertising.
16. Human Capital/Resources: recruitment, retention, task selection, compensation.
17. Research and Development.
18. Financial Performance.
19. Product and Service Quality.
20. Client management (selection, loyalty, service).
21. Product and service pricing.
22. Evaluate and predict academic performance and impact.
23. Litigation: predictive coding, outcome/cost/duration prediction, bias of courts, voire dire.
24. Games (e.g., chess, backgammon, jeopardy).
25. Econometrics analysis.
26. University admissions modeling.
27. Mapping fields of activity.
28. Movie recommendations.
29. Analysis of promotion and tenure strategies,
30. Intension detection and lie detection based on fMR1 readings.
31. Dynamic Control (e.g., autonomous systems such as vehicles, missiles; industrial robots; prosthetic limbs).
32. Supply chain management.
33. Optimizing medical outcomes, safety, patient experience, cost, profit margin in healthcare systems.
34. Molecular profiling and sequencing based diagnostics, prognostics, companion drugs and personalized medicine.
35. Medical diagnosis, prognosis and risk assessment.
36. Automated grading of essays.
37. Detection of plagiarism.
38. Weather and other physical phenomena forecasting.

The present invention in particular addresses the following aspects of predictive modeling: once a predictive model is built, validated, and applied on a set of objects, by a data analytics system (or even by manual modeling), consumers of the model information need assistance to navigate through the results. This is because both regression and classification models that output continuous values (e.g., probability of belonging to a class) are often used to rank objects and then a thresholding of the ranked scores needs to be used to separate objects into a "positive" and a "negative" class. The choice of threshold greatly affects the true positive, false positive, true negative, and false negative results of the model's application.

An ideal data analytics system should allow the user to understand the tradeoffs of different threshold values for different thresholds. The user interface should convey this information in an intuitive manner and provide the ability to vary the threshold interactively while simultaneously presenting the effects of thresholding on predictivity. This is precisely the function of the present invention. In addition to manual thresholding, the invention also allows for the thresholding to be performed by fully automated means (via standard statistical optimization methods) once a user has identified the desired balance of false positives and false negatives (or other predictivity metrics of interest). Notably, even in classifier systems that output direct assignments of objects to classes (e.g., some decision trees, certain rule systems etc.) such classifiers invariable have parameters the choice of which affects classifications. "Thresholding" then refers to tuning these parameters that affect classification. The invention therefore can be applied to practically any predictive modeling setting and application field.

DETAILED DESCRIPTION OF THE INVENTION

We refer to the invention as a "threshold (optimization) navigator". The threshold navigator presented here as was implemented in an actual litigation predictive modeling application (undertaken by Rational Intelligence Partners LLC in 2013). References [6, 7] provide background information about the theory of sampling, predictive modeling, comparative performance characteristics of various predictive modeling paradigms, and use of classifier thresholding) that inform the design of the navigator.

Figure 1:
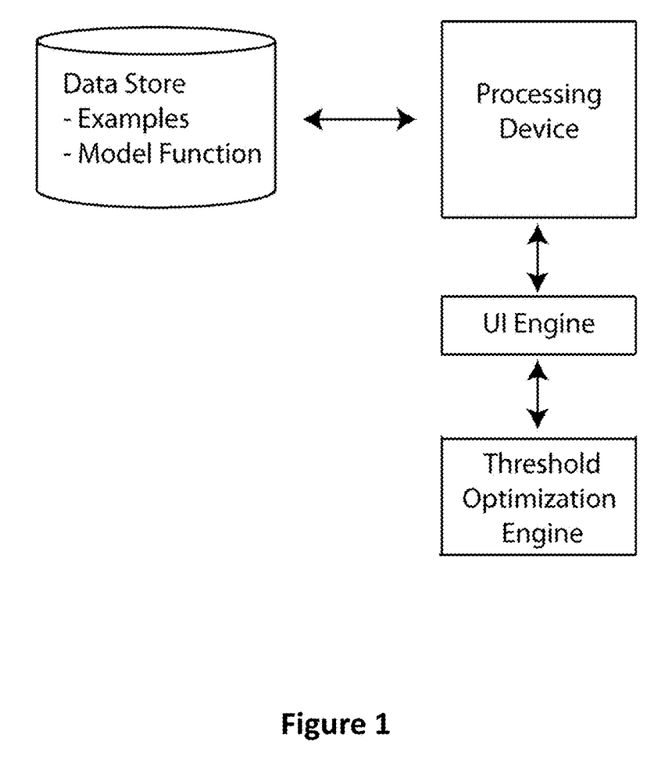
FIG. 1 is a block diagram of an optimized threshold navigation system.

FIG. 1 shows the system architecture consisting of a data store, such as a memory device, that contains labeled objects for predictive modeling and one or more models. The examples and model function are operated by a processing device which applies the model function to the examples to generate a score or ranking. The processing device outputs on a display device such as a computer monitor, hand held portable, etc. The processing device invokes the user interface engine which implements the threshold optimization navigator.

Figure 2:
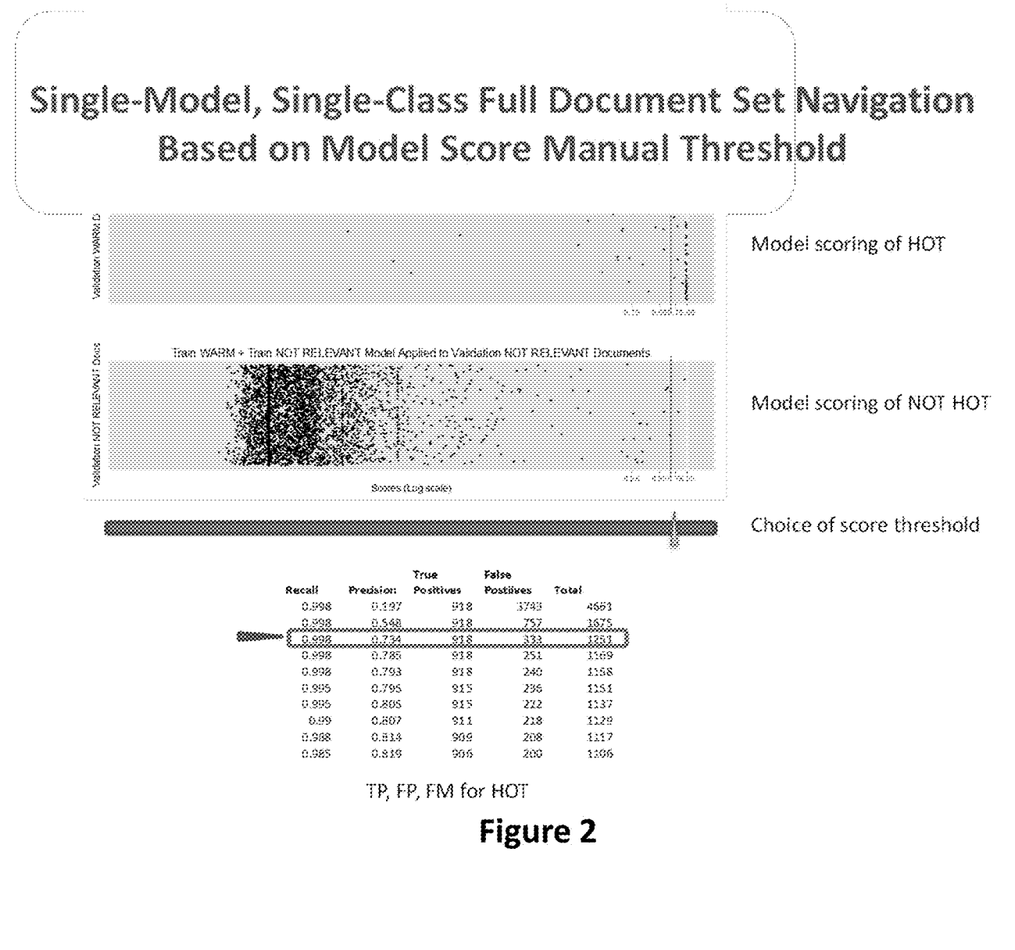
FIG. 2 is a diagram of single model, single class example set navigation based on a manual threshold.
Figure 7:
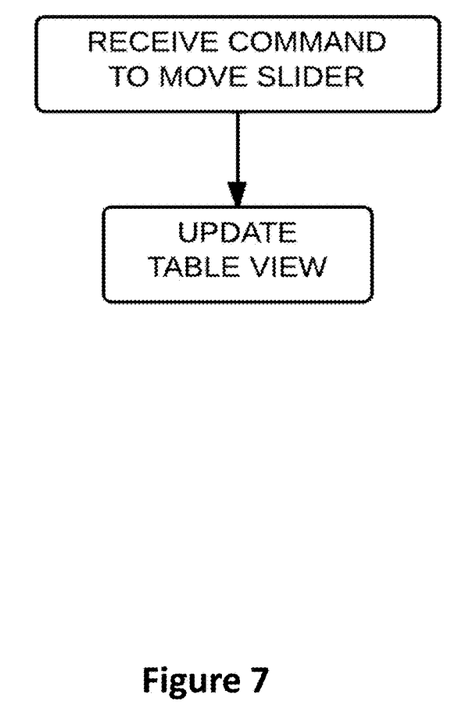
FIG. 7 is a flow diagram of moving the threshold vertical bar and the table transition.
Figure 8:
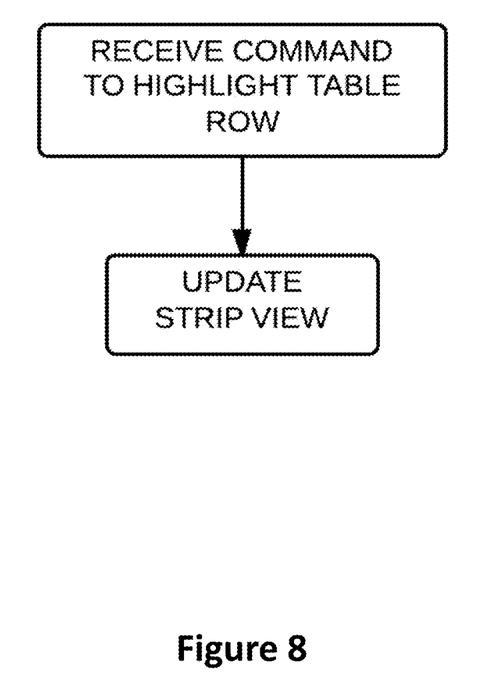
FIG. 8 is a flow diagram of selecting a table row and moving the threshold vertical bar.

FIG. 2 shows the threshold navigator for single model function applied to a single binary class. In this example, two strips are represented. Each strip contains a series of icons, in this case, filled circles, each denoting an individual document that needs to be classified. Each circle is randomly placed in the vertical scale to aid visualization. Each document has a label assigned by a multitude of methods. The top strip shows an example of class one ("HOT" documents in this litigation context). The bottom strip shows an example of class two ("NOT HOT" documents in this litigation context). The horizontal scale shows the scores assigned to each document by the processing device according to a log scale. As the score threshold is chosen, the invention executes updates to the corresponding table as explained in the flow diagram in FIG. 7. A choice of threshold is represented on the strips by a vertical bar and on the side of the tables by an arrow. The bars and arrows are "linked" visually so that movement of one (by the user) also moves the other. The table in FIG. 2 shows the metrics for binary classification at each threshold. Metrics may include recall, precision, lift, specificity, etc. shown at each threshold.

Figure 3:
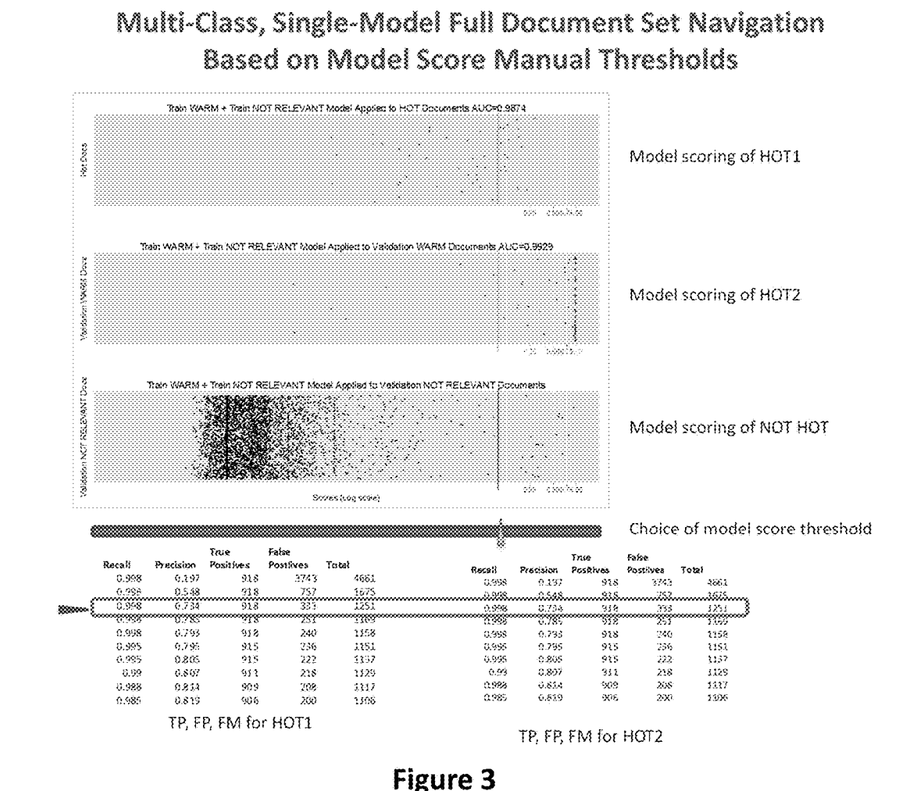
FIG. 3 is a diagram of a multi-class, single-model example set navigation based on a manual threshold.

FIG. 3 shows the threshold navigator with a single predictive model function applied to multiple classes. The top strip shows the model scores applied to class one ("HOT1" documents in this litigation context, representing a particular type of "hot" document). The middle strip shows the model scores applied to class two ("HOT2" documents in this litigation context, representing a different type of "hot" document). The bottom strip shows the model scores applied to the negative class (neither HOT 1 nor HOT2). Each class has a table denoting important predictivity results such as true Positives (TP), True Negatives (TN), False Positives (FP), False Negatives (FN), Precision, Recall, etc., corresponding to the chosen thresholds. The tables are configurable so that they only display predictivity metrics of interest to the particular user in that session. As the score threshold is chosen, the invention executes updates to the corresponding table as explained in the flow diagram in FIG. 7.

Figure 4:
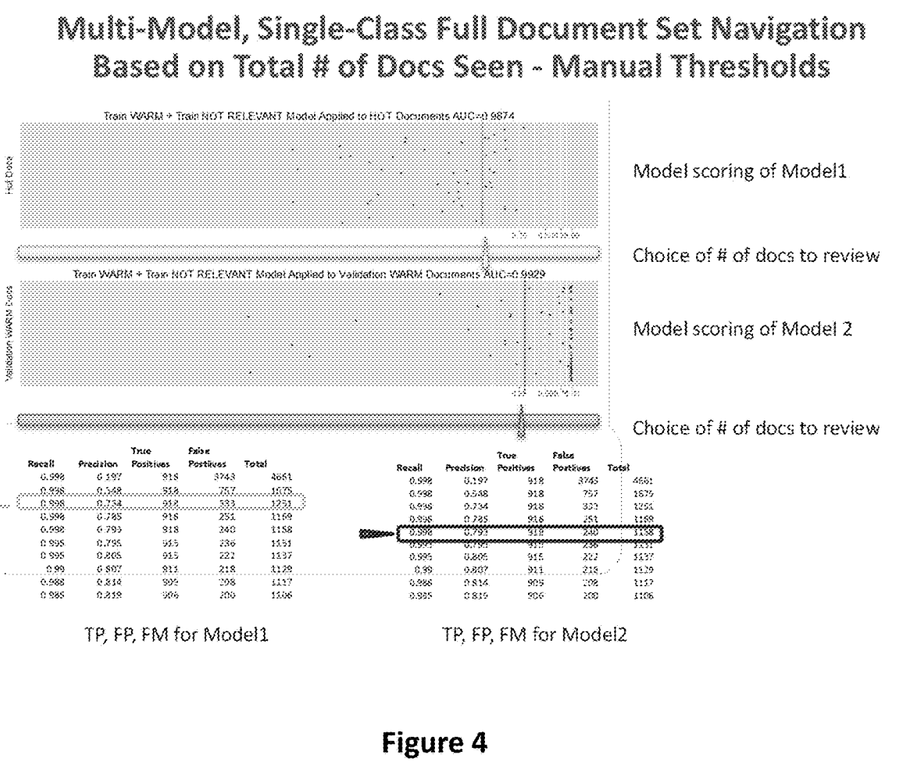
FIG. 4 is a diagram of a multi-model, single-class example set navigation based on total number of documents seen with manually set thresholds.

FIG. 4 presents an example of the threshold navigator used to optimize multiple models applied to a single binary classification. The top strip depicts scored examples from model one. The bottom strip depicts the same scored documents in the top strip scored by model two. Each model has a threshold slider selected manually by the Input Device depicted in FIG. 1. Each model also has a corresponding table with dynamically updated predictivity results as previously explained.

Figure 5:
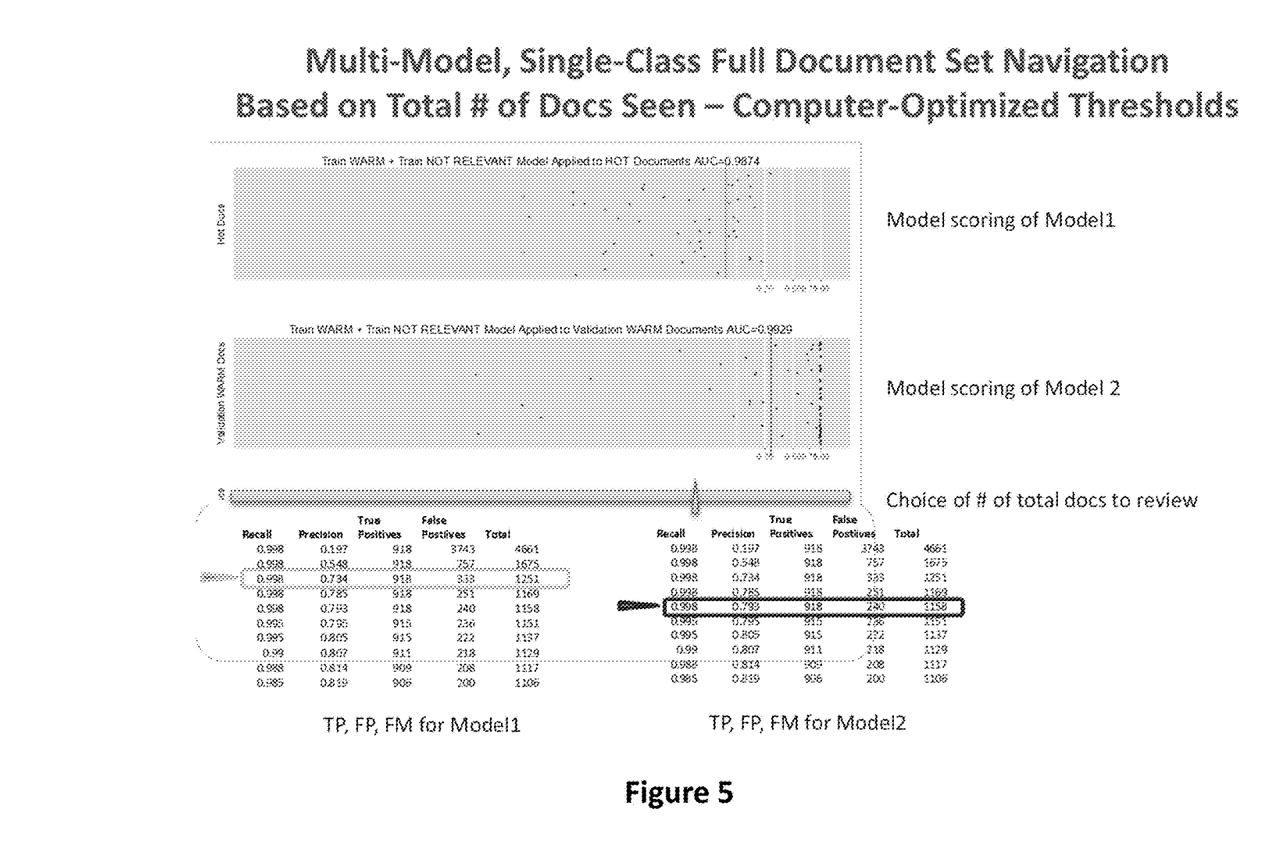
FIG. 5 is a diagram of a multi-modal, single-class document set navigation based on total number of documents seen with computer-optimized thresholds.
Figure 6:
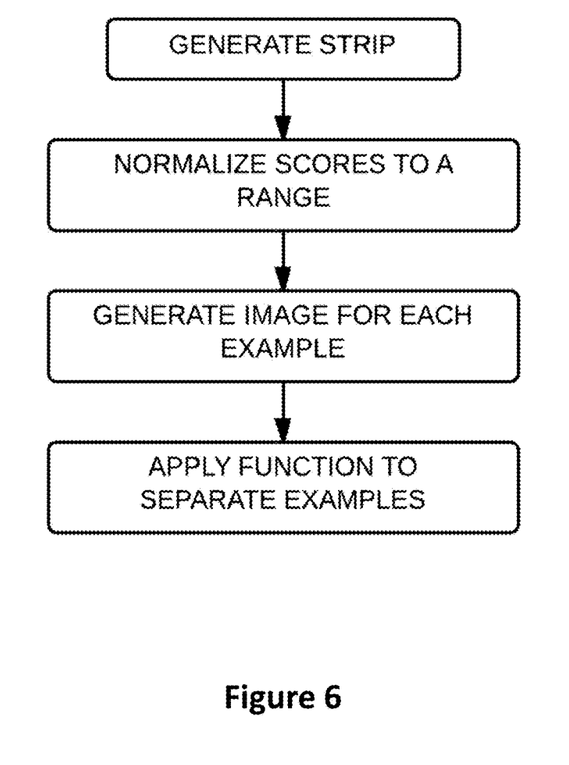
FIG. 6 is a flow diagram of constructing the navigator with examples.

FIG. 5 presents another application of the threshold navigator. This application is similar to the ones in FIGS. 2-4 but refers to two additional types of functionality. The first allows the threshold choice to be constraint by other criteria. For example, threshold choices can be restricted based the maximum number of documents classified as positives that can be read and used by the user. The second functionality takes as input the user's preference about the acceptable ratio of false positives to true positives and ratio of true positives to false negatives, and then the system can automatically identify the threshold that maximizes true positives and minimizes false negatives in accordance with the user's preferences.

A potentially large number of exemplary embodiments and variants of the present invention can be obtained, examples and features of which follow:

(a) Classified objects are not limited to documents.
(b) The user can "freeze" and save or overlay a threshold line and corresponding performance table so that multiple thresholding scenarios can be considered and compared.
(c) The strip need not be horizontal and can be displayed vertically.
(d) The scoring scale can be linear, logarithmic, standard deviation scale, or undergo other transformations.
(e) Random vertical jittering was used to separate the presented examples. Other methods include making points semitransparent, binning the data into rectangles, binning the data into hexagons, using box plots, and using alternative colors.

(f) Points can be represented in various sizes, shapes, and colors to denote additional information. For example the size of the point can correspond to an importance score. Or alternatively, a color can denote a meta-property of the object.

(g) Points can be made clickable or hoverable and kick off another event (e.g., displaying contents or other aspects of the object).

(h) The strip may also show a vertical bar generated to indicate a baseline performance measure (for example, set by a third party or a default trade-off among false negatives, false positives, and true positives).

(i) The strip may also contain labels for each point.

Method and System Output, Presentation, Storage, and Transmittance

The structured data stream of the method's output can be routed to a number of presentation, data/format conversion, data storage, and analysis devices including but not limited to the following: (a) electronic graphical displays such as CRT, LED, Plasma, and LCD screens capable of displaying text and images; (b) printed graphs, maps, plots, and reports produced by printer devices and printer control software; (c) electronic data files stored and manipulated in a general purpose digital computer or other device with data storage and/or processing capabilities; (d) digital or analog network connections capable of transmitting data; (e) electronic databases and file systems. The data output is transmitted or stored after data conversion and formatting steps appropriate for the receiving device have been executed.

Software and Hardware Implementation

Figure 9:
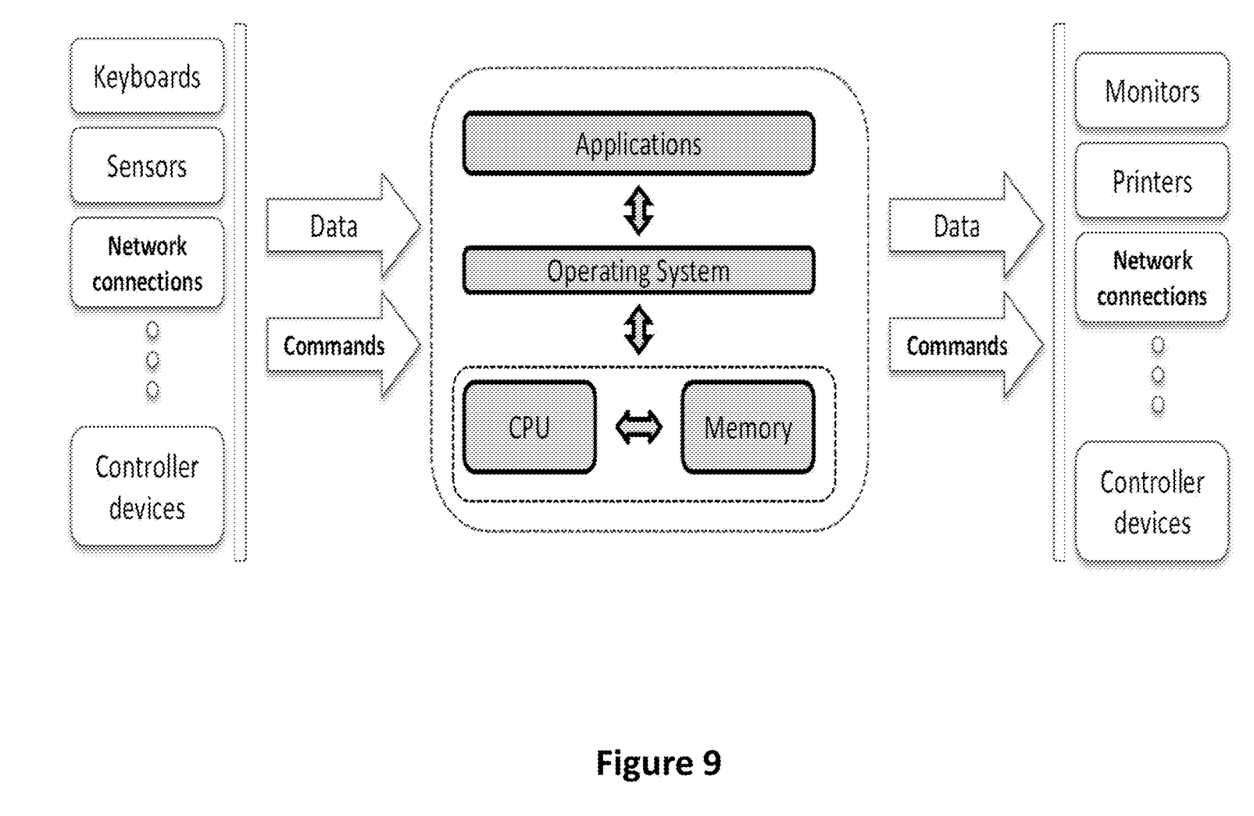
FIG. 9 shows the organization of a general-purpose modern digital computer system such as the ones used for the typical implementation of the invention.

Due to large numbers of data elements in the datasets, which the present invention is designed to analyze, the invention is best practiced by means of a general purpose digital computer with suitable software programming (i.e., hardware instruction set) (FIG. 9 describes the architecture of modern digital computer systems). Such computer systems are needed to handle the large datasets and to practice the method in realistic time frames. Based on the complete disclosure of the method in this patent document, software code to implement the invention may be written by those reasonably skilled in the software programming arts in any one of several standard programming languages including, but not limited to, C, Java, and Python. In addition, where applicable, appropriate commercially available software programs or routines may be incorporated. The software program may be stored on a computer readable medium and implemented on a single computer system or across a network of parallel or distributed computers linked to work as one. To implement parts of the software code, the inventors have used MathWorks Matlab® and a personal computer with an Intel Xeon CPU 2.4 GHz with 24 GB of RAM and 2 TB hard disk.

REFERENCES

1. Davenport T H, Harris J G: Competing on analytics: the new science of winning: Harvard Business Press; 2013.
2. Douglas L: The Importance of 'Big Data': A Definition. *Gartner* (June 2012) 2012.
3. NIH Big Data to Knowledge (BD2K) [http://bd2k.nih.gov/about_bd2k.html#bigdata]
4. Provost F, Fawcett T: Data Science for Business: What you need to know about data mining and data-analytic thinking: "O'Reilly Media, Inc."; 2013.
5. Siegel E: Predictive Analytics: The Power to Predict Who Will Click, Buy, Lie, or Die: John Wiley & Sons; 2013.
6. Aliferis C, Statnikov A, Aphinyanaphongs Y, Fu L, McCreary M, McCutcheon M: Predictive Coding: Value, Technology and Strategic Opportunity. In.: Rational Intelligence; 2013.
7. Aphinyanaphongs Y, Fu L D, Li Z, Peskin E R, Efstathiadis E, Aliferis C F, Statnikov A: A comprehensive empirical comparison of modern supervised classification and feature selection methods for text categorization. *Journal of the Association for Information Science and Technology* 2014.

We claim:

1. A computer aided technique for visually analyzing the results of the application of predictive models to data sets, including big data, comprising the following steps:
   a) storing data and predictive models;
   b) selecting a predictive model;
   c) applying the predictive model to the data to generate a score for each data object;
   d) selecting an analytical threshold to employ with the scores;
   e) outputting a graphical display that shows the data objects arranged along an axis according to their predictive model score along with an indication of the value of a currently chosen threshold;
   f) outputting a table with a row associated with the threshold and columns showing expected predictive performance metrics calculated from performance statistics of the predictive model; and
   g) repeating steps d) through f) for a different threshold and dynamically updating the display and tables with the data for each threshold
   wherein the density of values in the graphical display and the tabular output informs the user choice in selecting an appropriate threshold.

2. The method of claim 1 further comprising:
   h) repeating steps b) through g) for a different predictive model; and
   i) repeating step h) until all predictive models have been utilized or an acceptable threshold has been found
   wherein the graphical display and tables allow simultaneous depiction of one or more thresholds associated with one or more predictive models.

3. The method of claim 1 in which the user may input preferences or trade-offs among false positives, false negatives, true positives and true negatives.

4. The method of claim 2 in which the user may input preferences or trade-offs among false positives, false negatives, true positives and true negatives.

5. The method of claim 1 in which the user may input preferences for maximum number of objects classified as positive that can be examined by the user.

6. The method of claim 2 in which the user may input preferences for maximum number of objects classified as positive that can be examined by the user.

7. The computer implemented method of claim 1 further comprising:
   A) users can "freeze" and save or overlay a threshold line and corresponding performance table so that multiple thresholding scenarios can be considered and compared;
   B) graphical display can be organized horizontally or vertically;

C) scoring scales can be transformed from unit scale to logarithmic, standard deviation scale, or other standard statistical transformations;
D) graphical display allows making points semitransparent, binning the data into rectangles, binning the data into hexagons, using box plots, and using alternative colors;
E) representing points in various sizes, shapes, and colors to denote additional object information;
F) making points "clickable" or "hoverable" and triggering another event such as displaying contents or other aspects of the object;
G) displaying baseline performance measures set by a third party or default trade-off among false negatives, false positives, and true positives; and
H) the strip can display labels for each point.

8. The computer implemented method of claim 2 further comprising:
A) users can "freeze" and save or overlay a threshold line and corresponding performance table so that multiple thresholding scenarios can be considered and compared;
B) graphical display can be organized horizontally or vertically;
C) scoring scales can be transformed from unit scale to logarithmic, standard deviation scale, or other standard statistical transformations;
D) graphical display allows making points semitransparent, binning the data into rectangles, binning the data into hexagons, using box plots, and using alternative colors;
E) representing points in various sizes, shapes, and colors to denote additional object information;
F) making points "clickable" or "hoverable" and triggering another event such as displaying contents or other aspects of the object;
G) displaying baseline performance measures set by a third party or default trade-off among false negatives, false positives, and true positives; and
H) the strip can display labels for each point.

9. The method of claim 3 where once users input preferences about the acceptable ratio of false positives to true positives and ratio of true positives to false negatives, the system automatically identifies the threshold that maximizes true positives and minimizes false negatives in accordance with the user's preferences.

10. The method of claim 4 where once users input preferences about the acceptable ratio of false positives to true positives and ratio of true positives to false negatives, the system automatically identifies the threshold that maximizes true positives and minimizes false negatives in accordance with the user's preferences.

11. The method of claim 5 where, once users input preferences for maximum number of objects classified as positive that can be examined by the user, the system automatically identifies the threshold that maximizes true positives and minimizes false negatives in accordance with the user's preferences.

12. The method of claim 6 where once users input preferences for maximum number of objects classified as positive that can be examined by the user, the system automatically identifies the threshold that maximizes true positives and minimizes false negatives in accordance with the user's preferences.

* * * * *